Feb. 16, 1965 F. O. DAELLENBACH 3,169,774

RECORD PLAYER REPEAT ATTACHMENT

Filed May 8, 1962

INVENTOR.
Francis O. Daellenbach

BY Victor J. Evans & Co.
Attorneys

United States Patent Office 3,169,774

Patented Feb. 16, 1965

3,169,774

RECORD PLAYER REPEAT ATTACHMENT

Francis O. Daellenbach, 1304 E. 5th St., Cheyenne, Wyo.

Filed May 8, 1962, Ser. No. 193,196

1 Claim. (Cl. 274—14)

The present invention relates to record players generally and in particular to an attachment for a record player so that the record player may be caused to repeat.

Presently available commercially are long playing records for the purpose of teaching languages. It is often a necessity to have a portion of the record repeated so that a phrase may be more readily understood or interpreted. For this purpose a device to lift the tone arm off of a record and move it four or five or more grooves is advantageous. Heretofore, a person using the record player and desiring to have a phrase or more than one phrase repeated must manually lift the tone arm and replace it several grooves away. This inflicts damage to the needle and to the record in a great many of instances.

The primary object therefore of the present invention is to provide a device for lifting the tone arm of a record player, moving it several grooves of the record, and replacing it gently so as to not inflict etiher damage to the tone arm needle or to the record.

Another object of the present invention is to provide a device for causing a record on a record player to be repeated, the control for such a device being remote from the record player.

A further object of the present invention is to provide a device for causing the tone arm of a record player to be lifted and shifted either a single groove or several grooves as desired on the record before replacing the same.

Figure 1:
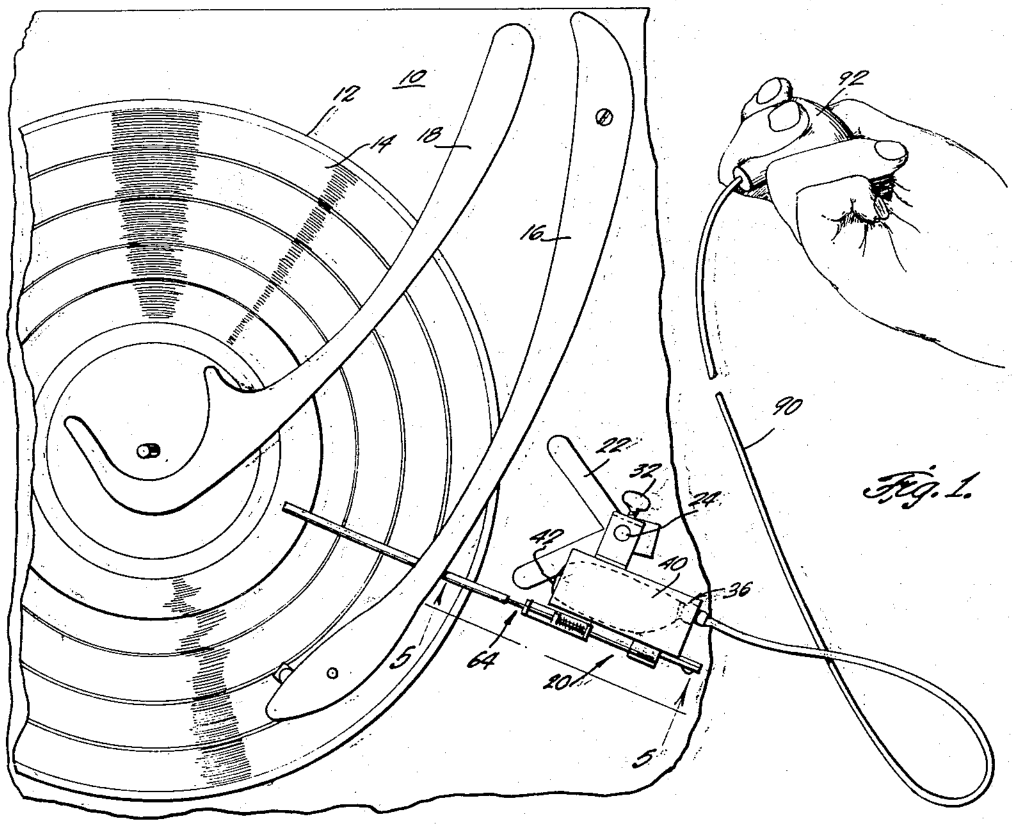
Figures 2, 3, 4, 5, 6:
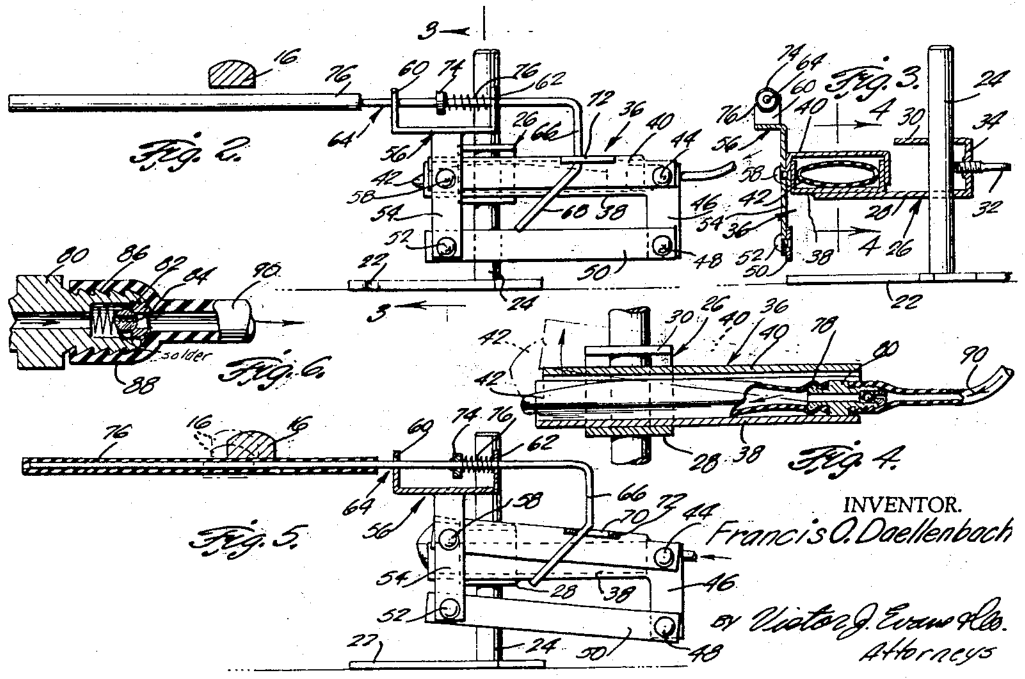

These and other objects and advantgaes of the invention will be fully comprehended from a study of the following description when taken in connection with the annexed drawing, in which:

FIGURE 1 is a fragmentary plan view of a record player showing the device of the present invention in use, FIGURE 2 is an elevational view on an enlarged scale of the device shown in FIGURE 1, the tone arm being shown in section, FIGURE 3 is a view taken on the line 3—3 of FIGURE 2, the tone arm being omitted, FIGURE 4 is a view on an enlarged scale, taken on the line 4—4 of FIGURE 3, the dotted line showing the movement of the tone arm lifting mechanism, FIGURE 5 is a view taken on the line 5—5 of FIGURE 1 and on an enlarged scale, the device being shown in a position of operation, and FIGURE 6 is an enlarged view of the ball check valve shown in FIGURE 4 showing it in a condition of exhaust.

With reference to the drawing in detail, in which like figures represent like parts throughout the several views, the reference numeral 10 designates the base plate of a record player having thereon a turntable 12 on which is positioned a record 14 such as a long playing record employed for teaching languages or the like.

The record player also includes a tone arm 16 and a release arm 18 of the changing mechanism, neither of which need be further described as not being a part of the present invention.

The device of the present invention is designated generally by the reference numeral 20 and it includes a substantially Y-shaped base 22 from which rises a post 24. A U-shaped element 26 having legs 28 and 30 each provided with a hole through which extends the post 24 is slidably mounted upon the post 24 for upward and downward movement. A thumbscrew 32 extending through the bight 34 of the element 26 is used to secure the element 26 in any position of its adjusted upward or downward movement.

As will be seen most clearly in FIGURE 3, the leg 28 of the element 26 is longer than the leg 30 and the projecting end portion serves as a support for an actuating member 36.

The member 36 consists in a first channel member 38 facing upwardly and a second channel member 40 facing downwardly and superimposed upon the channel member 38. As shown most clearly in FIGURE 3, the flanges of the channel member 40 are exteriorly of the flanges of the channel member 38.

In the space between the channel members 38 and 40 is an inflatable flexible bag 42 fabricated of rubber, plastic or the like. A pivot pin 44 connects the channel member 40 to the fixed channel member 38 for pivotal movement of the channel member 40 from the full line position shown in FIGURE 4 to the dotted line position.

Directly beneath the pin 44 and formed integrally with the channel member 38 or fixedly secured thereto is a depending leg 46. On the lower end of the leg 46 is another pivot pin 48 by means of which an arm 50 is pivotally connected thereto.

The other end of the arm 50 is connected by a pin 52 to the lower end portion of the stem 54 of a support bracket 56. Another pin 58 pivotally connects the midportion of the stem 54 to the end of the channel member 40 remote from the pin 44.

The upper end portion of the bracket 56 is bifurcated and the legs 60 and 62 thereof are provided with holes through which slide an actuating rod 64. One end portion 66 of the rod 64 is bent downwardly and terminates in an inwardly bent portion 68 as shown most clearly in FIGURE 5. The downwardly and inwardly bent portion 68 of the rod 64 is engageable with the end of a slot provided in a bracket 72 which projects outwardly from the side of the channel member 40.

Between the legs 60 and 62 of the bracket 56 and circumposed about the rod 64 is a collar 74 fixedly secured to the adjacent portion of the rod 64. A coil spring 76 is interposed between the collar 74 and the adjacent leg 62 and biases the rod 64 to the position outwardly of the leg 60. On the outwardly extending portion of the rod 64 is a resilient sleeve 76 which prevents marring of the tone arm 16 when it lifts it.

With particular reference to FIGURES 4 and 6, the bag 42 is seen to have one end 78 secured to one end of a nipple 80 in which there is a ball check valve 82. The ball of the ball check valve 82 is provided with a restricted opening 84 for bleeding the air from the bag 42.

The other end of the nipple 80 remote from the bag 42 is provided with serrations 86 which secure the enlarged end portion 88 of a flexible hose 90 to the nipple 80. The other end of the hose 90 terminates in a hand bulb 92 which may be collapsed by finger pressure when it is desired to force air through the hose 90. The nipple 80 is fixedly secured by solder or other means to the channel member 38.

With reference to FIGURES 2 and 5, it will be seen that upon inflation of the bag 42 due to air pressure therein as effected by squeezing of the bulb 92, the channel member 40 will move from the full line position shown in FIGURE 4 to the dotted line position. This results in raising of the stem 54 vertically while shifting the same slightly to the right in FIGURE 5.

Because of the fulcrum point 44, the pin 58 rises a greater distance than does the end of the bracket 72 which engages the rod portion 68. Therefore with the stem 54 moving upwardly the rod portion 68 engages on the end of the slot 70 or on the adjacent portion of the bracket 72 and tends to shift the rod 64 to the right against the compression of the spring 76.

This results in lifting of the tone arm by the rod 64 from the dotted line position shown in FIGURE 5 to the full line position. The upward movement of the rod 64 first lifts the tone arm 16 and then as the rod 64 moves to the right it moves the tone arm to the right also.

The spring 76 is weak and will not shift the tone arm 16 to the former position when the rod 64 is lowered upon deflation of the bag 42. Instead, the rod 64 stays in its position relative to the left or right in FIGURE 5 while the channel member 40 descends with the deflation of the bag 42. The restricted opening 84 in the ball check valve 82 is such that the bag deflates slowly although it may be pumped up quickly by rapid pressure on the bulb 92 which permits air to flow around the ball check valve 82.

When the arm 64 descends as soon as it is released from the weight of the tone arm 16, the spring 76 pushes the arm 64 outwardly to its original position.

The tone arm has been moved several grooves on the record 14 depending upon how quickly and how much air was pumped into the bag 42 by pressure on the bulb 92.

It will be seen that the hose 90 can be of any practical length and therefore the user of the record player can sit at a remote position from the record player and cause the record player to repeatedly repeat for any purpose desired.

The sleeve 76 also provides friction between the rod 64 and the tone arm 16 so that the latter is moved with positive action.

While only a preferred embodiment of the present invention is shown and described other embodiments are contemplated and numerous changes and modifications may be made in the invention without departing from the spirit thereof as set forth in the appended claim.

What is claimed is:

In a device for lifting the tone arm of a record player from a record on the turntable of such player and resetting the tone arm on the record so as to repeat the signal developed by said tone arm from said record, said device including a base adapted to be supported upon said record player in a position adjacent to and spaced from the turntable, a post rising from said base, a support element mounted on said post, and a horizontally disposed rod having the portion adjacent one end operatively connected to said support element for reciprocating longitudinal movement and for upward and downward movement of said rod, said rod being adapted to underlie the tone arm of said record player when said base is mounted thereon and to lift said tone arm upon execution of upward movement of said rod, shift said tone arm laterally upon execution of longitudinal movement of said rod, and lower said tone arm upon execution of downward movement of said rod, pneumatic means for effecting the upward and downward movement of said rod, said means consisting in an inflatable bag carried by said support element and operatively connected to said rod so as to raise said rod when said bag is inflated, a hand compressible bulb for air, a tube connecting said bulb to said bag, pivotal means operatively connected to said rod and carried by said support element having vertical and horizontal components of movement for effecting the movement of said rod in one longitudinal direction responsive to upward movement of said rod, and spring means biasing said rod in the opposite direction, and a restricted relief valve in said bag to deflate the bag slowly to reset the tone arm on the record with ease.

References Cited by the Examiner

UNITED STATES PATENTS 1,343,087 6/20 Peremi ---------------- 274—14
1,489,436 4/24 Hess ------------------ 274—14

FOREIGN PATENTS 441,299 1/36 Great Britain.

LOUIS J. CAPOZI, *Primary Examiner.*

EMIL G. ANDERSON, *Examiner*.